United States Patent
Berman et al.

(10) Patent No.: US 7,567,712 B2
(45) Date of Patent: Jul. 28, 2009

(54) METHOD OF IDENTIFYING ENDMEMBER SPECTRAL VALUES FROM HYPERSPECTRAL IMAGE DATA

(75) Inventors: Mark Berman, Pymble (AU); Haari Taplo Kiiveri, Bullcreek (AU); Ryan Lagerstrom, Glebe (AU); Robert Aldan Dunne, Darlington (AU)

(73) Assignee: Commonwealth Scientific and Industrial Research Organisation, Campbell Act (AU)

( * ) Notice: Subject to any disclaimer, the term of this patent is extended or adjusted under 35 U.S.C. 154(b) by 646 days.

(21) Appl. No.: 10/510,078

(22) PCT Filed: Apr. 4, 2003

(86) PCT No.: PCT/AU03/00409

§ 371 (c)(1),
(2), (4) Date: Dec. 14, 2004

(87) PCT Pub. No.: WO03/088130

PCT Pub. Date: Oct. 23, 2003

(65) Prior Publication Data

US 2005/0180634 A1    Aug. 18, 2005

(30) Foreign Application Priority Data

Apr. 5, 2002  (AU) ........................... PS1552

(51) Int. Cl.
*G06K 9/46* (2006.01)
(52) U.S. Cl. ..................................... 382/191
(58) Field of Classification Search .................. 382/191
See application file for complete search history.

(56) References Cited

U.S. PATENT DOCUMENTS 6,208,752 B1    3/2001    Palmadesso et al.

(Continued)

FOREIGN PATENT DOCUMENTS

WO    WO 98/02842    1/1998

OTHER PUBLICATIONS

Neville, R.A., et al., "Automatic Endmemeber Extraction from Hyperspectral Data for Mineral Exploration", 4th *Airborne Remote Sensing Conference and Exhibition* (Jun. 21-24, 1999).

(Continued)

*Primary Examiner*—Yosef Kassa
*Assistant Examiner*—Edward Park
(74) *Attorney, Agent, or Firm*—Nixon & Vanderhye P.C.

(57) ABSTRACT

A method of identifying endmember spectral values from multispectral image data, where each multispectral data value is equal to a sum of mixing proportions of each endmember spectrum. The method comprises the steps of processing the data to obtain a multidimensional simplex having a number of vertices equal to the number of endmembers. The position of each vertex represents a spectrum of one of the endmembers. Processing the data is conducted by providing starting estimates of each endmember spectrum for each image data value. The mixing proportions for each data value is estimated from estimates of the spectra of all the endmembers. The spectrum of each endmember is estimated from estimates of the mixing proportions of the spectra of all the endmembers for each image data value. The estimation steps are repeated until a relative change in the regularised residual sum of squares is sufficiently small. The regularised residual sum of squares includes a term which is a measure of the size of the simplex.

13 Claims, 1 Drawing Sheet

U.S. PATENT DOCUMENTS 6,608,931 B2 *   8/2003   Sunshine et al. ............ 382/191

OTHER PUBLICATIONS

Shaw, G., et al., "Signal Processing for Hyperspectral Image Exploitation", *IEEE Signal Processing Magazine*, 19(1):12-16 (Jan. 2002).
Stein, D.W., et al., "Anomaly Detection from Hyperspectral Imagery", *IEEE Signal Processing Magazine*, 19(1):58-69 (Jan. 2002).

Winter, M., "N-FINDR: an algorithm for fast autnonomous spectral end-member determination in hyperspectral data", *Part of the SPIE Conference on Imaging Spectrometry V*, SPIE vol. 3753:266-275 (Jul. 1999).
Nirmal, Keshava et al; "Spectral Unmixing", IEEE Signal Processing Magazine, IEEE Service Center, Piscataway, NJ, vol. 19, No. 1, Jan. 2002, pp. 44-57, XP011093745.
Winter, E. M. et al; "Autonomous determination of endmembers in high spatial and spectral resolution data", Proceedings of the SPIE, Spie, Bellingham, VA; vol. 4049, 2000, pp. 504-510, XP007902497.

* cited by examiner

METHOD OF IDENTIFYING ENDMEMBER SPECTRAL VALUES FROM HYPERSPECTRAL IMAGE DATA

This application is the U.S. National Phase of International Application PCT/AU03100409, filed on Apr. 4, 2004, which designated the U.S. and claims priority to Australian Application No. PS 1552, filed Apr. 5, 2002. The entire contents of these applications are incorporated herein by reference.

FIELD OF THE INVENTION

The present invention relates to a method of identifying endmember spectral values from multispectral or hyperspectral image data, which is particularly useful in identifying different materials from multispectral or hyperspectral images.

BACKGROUND TO THE INVENTION

It is known to collect remote sensing data to provide images of scenes to aid in broad scale discrimination of various features of land scanned including identifying mineral deposits and vegetation Two examples of hyperspectral scanners are NASA's 224 band AVIRIS, which has bands spaced about every 10 nanometers in a range from 400 to 2500 nanometers, and the 128 band Australian commercial scanner, HyMap, which covers a similar wavelength range with about 16 nanometer resolution.

A goal is therefore to identify the components of each pixel in the hyperspectral image. This can be done by comparison with a library of spectra of "pure" materials. "Pure" materials in a hyperspectral image are often termed endmembers.

Depending on the resolution of the image obtained from the spectral scanner, an individual pixel may represent an area ranging in size from 5 to 10 meters across in images from an aircraft scan or 10 to 30 meters across from a satellite scan. Each pixel therefore will relate to a portion of a scene which will usually include a mixture of material components. It is not uncommon to find that not all of the pure spectral representations of endmembers are present in a scene.

Images are also subject to distortion due to noise from various sources including instruments, atmospheric interference, viewing geometry and topography of the area scanned. Corrections for these distortions are still not sufficiently accurate to allow for reliable comparisons to reference libraries. Also, many remotely sensed scenes contain materials not in libraries. Therefore, there are problems with matching spectra with ground-based libraries. There is consequently interest in identifying the component materials represented in a scanned scene, without reference to a library.

Similar problems occur in other fields where it is desired to determine endmembers from multispectral, hyperspectral or other data where a signal is detected on a number of channels or bands. For example a similar problem occurs in the analysis of proteomics and genomics array data where the signal represents cell or organism response across a range of proteins, cDNAs or oligonucleotides. In this context, each protein, cDNA or oligonucleotide is regarded as being equivalent to a wavelength or band in the hyperspectral or multispectral context. Similar problems also occur in fluorescence imaging such as fluorescence microscopy.

In the art the terms multispectral and hyperspectral, multidimensional and hyperdimensional etc. are used, with "hyper" generally meaning more than "multi". This distinction is not relevant for the purposes of this invention. For convenience, throughout the rest of the specification the term "multispectral" will be used to refer to both multispectral and hyperspectral data. The term "multidimensional" and other "multi" terms will likewise be used to mean more than one dimension.

Current solutions of finding endmembers often involve "whitening" or "sphering" the data and then fitting to the data a multidimensional simplex having a number of vertices equal to the number of endmembers.

The bands of a multispectral image are usually highly correlated. "Whitening" involves transforming the data to be uncorrelated with a constant variance and preferably an approximately Normal distribution of errors. It is also desirable to compress the dimensionality of the data to reduce calculation time.

A widely used algorithm to "whiten" the data is to compress the information into a smaller number of bands by use of the Minimum Noise Fraction (MNF) transform. This is disclosed in Green, A., Berman, M., Switzer, P., and Craig, M. (1988). *A transformation for ordering multispectral data in terms of image quality with implications for noise removal* IEEE Transactions on Geoscience and Remote Sensing, 26:65-74.

Simplex fitting using the pixel purity index (PPI) method is disclosed in Boardman, J. Kruse, F., and Green, R (1995) Mapping target signatures via partial unmixing of AVIRIS data. In Gram, R (editor), *Summaries of the Fifth Annual JPL Airborne Earth Science Workshop*, volume 1, AVIRIS Workshop, pp 23-26. JPL Publ. 95-1, NASA, Pasadena, Calif.

One of the main disadvantages of Boardman's method is that it requires considerable manual intervention in processing.

An alternative to Boardman's method is the N-FINDR algorithm by Winter, M. (1999). Fast autonomous spectral endmember determination in hyperspectral data In *Proceedings of the 13th International Committee on Applied Geologic Remote Sensing, Vancouver, vol. 2*, pp 337-334. This process is fully automated. After transformation to (M-1) dimensional subspace, this algorithm finds the M-dimensional simplex of maximum volume constrained to lie within the data cloud. Another alternative is to construct the minimum volume simplex enclosing the data cloud, which is provided by Craig, M. (1994). Minimum-volume transforms for remotely sensed data. *IEEE Transactions on Geoscience and Remote Sensing*, 32:542-552.

These solutions cannot satisfactorily deal with the common situation where pure or almost pure endmembers are absent from the scene. Furthermore, they do not deal well with noise in the data.

SUMMARY OF THE PRESENT INVENTION

It is an object of the present invention to provide an improved method of identifying endmembers spectral values from multispectral data According to the present invention there is provided a method of identifying endmember spectral values from multispectral image data, where each multispectral data value is equal to a sum of mixing proportions of each endmember spectrum, said method including the steps of:

processing the data to obtain a multidimensional simplex having a number of vertices equal to the number of endmembers, the position of each vertex representing a spectrum of one of the endmembers, wherein processing the data includes:

providing starting estimates of each endmember spectrum for each image data value;

estimating the mixing proportions for each data value from estimates of the spectra of all the endmembers;

estimating the spectrum of each endmember from estimates of the mixing proportions of the spectra of all the endmembers for each image data value;

repeating estimation steps until a relative change in the regularised residual sum of squares is sufficiently small, the regularised residual sum of squares including a term which is a measure of the size of the simplex.

Preferably the term used in the regularised residual sum of squares is the sum of the squared distances between all of the simplex vertices.

Preferably the step of providing the staring estimates includes choosing starting points with a high pixel purity index score. More preferably the starting estimates are well separated.

Preferably the relative change in the regularised residual sum of the squares is regarded as sufficiently small when the ratio of successive values of regularised residual sum of squares is less than a tolerance. Preferably the tolerance is 0.99999.

Preferably processing the data includes whitening the data Preferably whitening the data includes conducting a transform of the data into data that is not band correlated. Preferably processing the data includes removing bands that do not have a high signal to noise ratio.

Preferably the step of estimating the spectrum of each endmember is conducted using a linear estimation technique.

Preferably the step of estimating the mixing proportions is conducted using a quadratic programming minimisation technique.

BRIEF DESCRIPTION OF THE DRAWINGS

In order to provide a better understanding a preferred embodiment of the present invention will now be described in detail, by way of example only, in relation to FIG. 1 which is a diagrammatic representation of a simple example of the use of the method of the present invention.

DETAILED DESCRIPTION OF PREFERRED EMBODIMENTS

Figure 1:
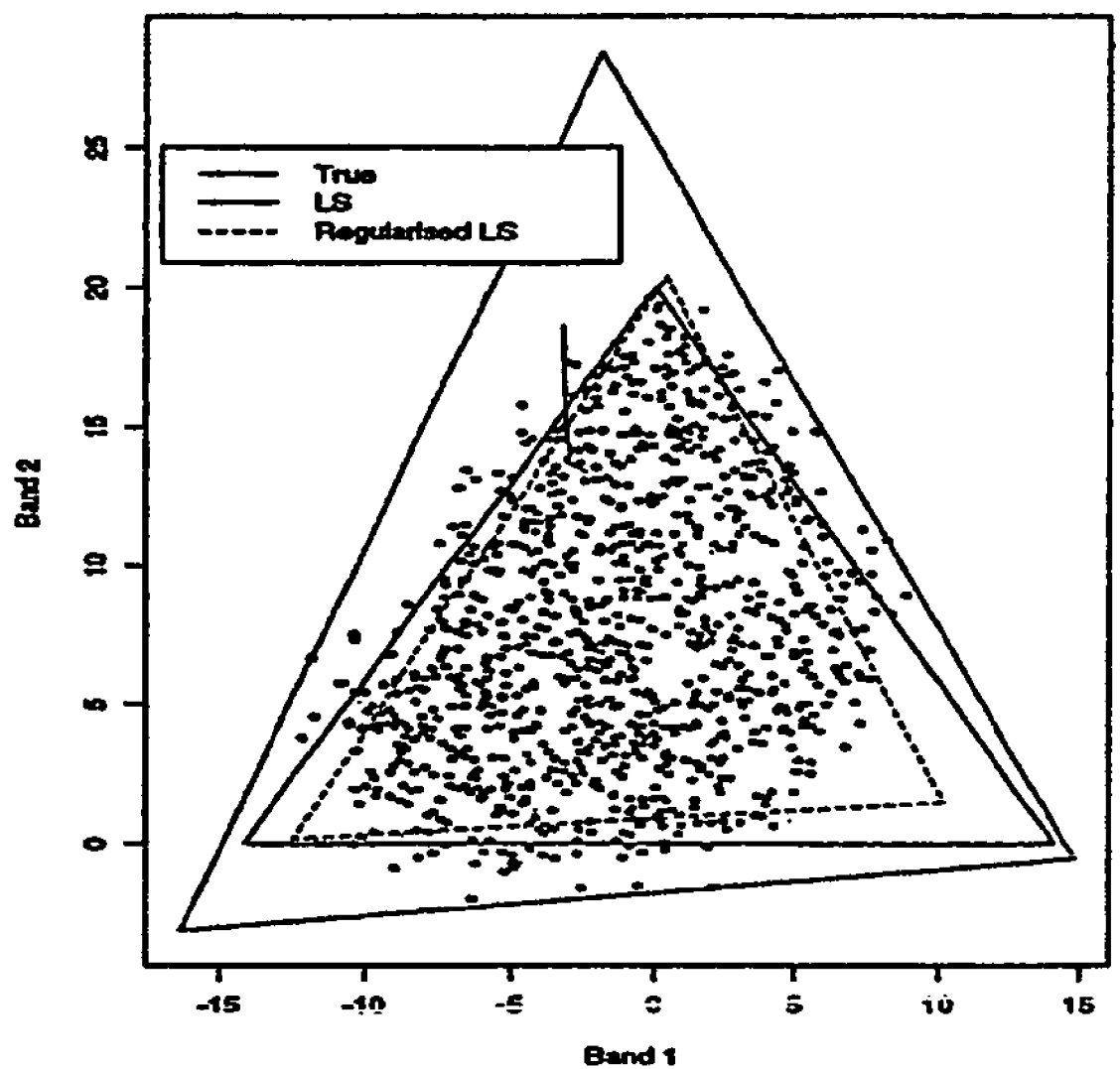

Multispectral image data is obtained from a multispectral scanner, such as the AVIRIS airborne scanner. A typical scan for mineral applications includes a short wave infra red scan with wavelengths in the region of 2,000 to 2,500 nanometers. This spectral range is useful for exhibiting distinctive shapes for important clay minerals. Typically this will provide 10's of thousands to millions of pixels or even many more.

A MNF transform is performed on the relevant bands of data to produce variables which are uncorrelated and approximately Normally distributed with an estimated error variance of 1. It is usual to retain MNF bands with the highest signal to noise ratios.

We let d be the number of MNF bands retained, N is the number of pixels, and M is the number of endmembers (assumed to be less than or equal to d+1).

It is convenient to think of the MNF data as an N×d matrix, whose ith row is written as $X_i$, and whose jth column is written as $x_j$. Similarly, it will also be convenient to think of the unknown endmembers as an M×d matrix, whose kth row is written as $E_k$ and whose jth column is written as $e_j$.

The MNF transformed data can be represented by the following formula:

$$X_i = \sum_{k=1}^{M} p_{ik} E_k + \varepsilon_i, i = 1, \ldots, N. \tag{1}$$

Here $\varepsilon i$ is an error vector, and the $p_{ik}$ are mixing proportions that satisfy the constraints of:

$$p_{ik} \geq 0, k = 1, \ldots, M, \quad \sum_{k=1}^{M} p_{ik} = 1, i = 1, \ldots, N. \tag{2}$$

If the error term is ignored then (1) and (2) tell us that the data lie inside a simplex in (M-1) dimensional space, and the MNF representations of the M endmembers are at the vertices of the simplex.

A least squares minimisation of equation (1) is conducted subject to the constraints (2) and a term that constrains the size of the simplex, while being faithful to the model. It can be shown that without the constraints the solution converges to a simplex that is too large. This problem maybe solved iteratively: given estimates of the endmember spectra, the proportions for each pixel are estimated, which is a quadratic programming problem; and given estimates of the proportions, the endmember MNF spectra are estimated, which is a linear estimation problem.

The constraint is the addition of a term to the residual sum of squares which is a measure of the size of the simplex. A convenient term to add is the sum of squared distances between all of the simplex vertices. It can easily be shown that this is proportional to the sum of the variances of the simplex vertices over the d dimensions which is a quadratic function of the vertices and therefore computationally convenient. The regularised solution minimises:

$$R = \sum_{j=1}^{d} \{(x_j - Pe_j)^T(x_j - Pe_j) + \lambda e_j^T D e_j\}, \tag{3}$$

where $\lambda$ is small, and where $D = I_M - 11^T/M$.

R is the regularised residual sum of squares; P is a N×M matrix of proportions of M endmembers for all N pixels; $I_M$ is the M×M identity matrix and 1 is the vector of length M, where every entry equals 1.

Formula (3) is minimised iteratively.

In what follows, $P_l$ will denote the estimated value of P after the lth iteration, and either $e_{j,l}$, j=1, . . . , d or $E_{k,l}$, k=1, . . . , M will denote the estimated endmembers after the lth iteration.

1. Let $e_{j,o}$, j=1, . . . , d denote the starting values for the algorithm and let l=1.
2. Let $P_l$ denote the value of P minimising $$R_{l,t} = \sum_{j=1}^{d} \{(x_j - Pe_{j,l-1})^T(x_j - Pe_{j,l-1}) + \lambda e_{j,l-1}^T D e_{j,l-1}\}, \tag{4}$$

subject to (2). This is done using a quadratic programming algorithm.

There are two things to note here. First, the second term in (4) is independent of P, and so only the first term needs to be minimised in this step. Second, we can separate the minimisation into N separate quadratic programming minimisations for the data at each of the N pixels. Specifically, for i=1,..., N, we find $p_{j,k}$, =1,..., M, which minimise $$\left(X_i - \sum_{k=1}^{M} p_{ik} E_{k,l-1}\right)^T \left(X_i - \sum_{k=1}^{M} p_{ik} E_{k,l-1}\right) \quad (5)$$

subject to (2).

Let $R_{l,1,min}$ denote the minimum value of $R_{l,1}$ achieved.

3. Let $e_{j,l}$, j=1, ..., d denote the value of $e_j$ minimising $$R_{1,2} = \sum_{j=1}^{d} \{(x_j - P_l e_j)^T (x_j - P_l e_j) + \lambda e_j^T D e_j\} \quad (6)$$

This minimisation can be separated into d separate minimisations, and straightforward matrix algebra can be used to show that $$e_{j,l} = (P_l^T P_l + \lambda D)^{-1} P_l^T x_j, j=1, \ldots, d. \quad (7)$$

Let $R_{l,2,min}$ denote the minimum value of $R_{l,2}$ achieved. It can also be shown that $$R_{1,2,min} = \sum_{j=1}^{d} x_j^T \{I_N - P_l(P_l^T P_l + \lambda D)^{-1} P_l^T\} x_j, \quad (8)$$

where $I_N$ is the N×N identity matrix.

4. Let $$r_l = R_{l,2,min}/R_{l,1,min} \quad (9)$$

Because each step in the iteration reduces R, we must have $R_{l,2,min} \leq R_{l,1,min}$, or $r_l \leq 1$. When $r_l$ gets very close to 1, the algorithm stops. More specifically:

If $r_l$<tol, let l=l+1 and go to 2. Otherwise, stop and let $e_{j,l}$, j=1, ..., d, or equivalently $E_{k,l}$, k=1, ..., M, be the final estimates of the endmembers, and let the ith row of $P_l$ give the final estimates of the proportions of each of the estimated endmembers present in the ith pixel.

The process is terminated when a ratio of successive values of the regularised residual sum of squares is less than a tolerance (tol). The default tolerance value is 0.99999. Using this value in typical examples, 20 to 100 iterations are required until the process stops.

Using this method the projections of all the data onto this hyperplane need not lie inside the simplex.

FIG. 1 shows a simulated toy example with a true simplex as a solid line, an (unregularised) least squares solution as a dotted line and a regularised least squares solution as a broken line. The regularised least squares solution provides much better estimates of the true endmembers.

Most of the information about the simplex is contained in data on or near boundaries of the data cloud. So if only data nearest the convex hull of the data cloud is used computation becomes quicker. In high dimensional problems, points at or near the ends of random one dimensional projections of the data can be used Alternatively points only on or near two dimensional convex hulls of all d(d−1)/2 MNF band pairs are used.

The starting points for the iterative process can determine the outcome of the iterative process. Good staring points should be well separated in MNF space. Points with high PPI scores can be useful. The PPI scores are the number of times the data at each pixel are at or near one of the ends of these projections.

Apart from the estimates of the endmembers an intermediate product of the algorithm is the endmember proportions in each pixel. The proportions give a meaningful idea of how much each endmember is represented in each pixel (assuming that mixing is proportional to area). This can be represented as images/maps. A particularly useful diagnostic is the maximum proportion of each estimated endmember in the scene. The lower the maximum proportions for each endmember spectrum the further the estimated endmember is from the data cloud and the confidence in the estimate will be correspondingly smaller. For endmember estimates having a maximum proportion less than 0.5 it becomes difficult to estimate the true endmember spectrum.

Another useful by-product of the algorithm is an image showing the contribution of each pixel to the regularised residual sum of squares. If there are some large residuals and especially if they are spatially clustered it is an indication that the model is not fitting the data adequately, either because the chosen value of M is too small or if only the data on or near the boundaries of the data cloud are used then important observations may have been omitted from the algorithm. Additional observations can be added to the data used and the algorithm re-run to see whether fitting can be improved.

The present invention may be readily adapted to identify endmember spectral values from multispectral data from a variety of sources, such as remote sensing data, array data, etc.

Obvious adaptions of the preset invention to make the hereindescribed method suitable to identify endmembers from a nominated source are intended to fall within the scope of the preset invention.

Claims defining the invention are as follows:

1. A method of identifying endmember spectra values from a multispectral image comprising multispectral image data, where each multispectral data value is equal to a sum of mixing proportions of each endmember spectrum, said method including the steps of:

processing the multispectral image data to obtain a multidimensional simplex having a number of vertices equal to the number of endmembers, the position of each vertex representing a spectrum of one of the endmembers, wherein processing of the data includes:

providing starting estimates of each endmember spectrum for each image data value;

estimating mixing proportions for each data value from estimates of the spectra of all the endmembers;

estimating the spectrum of each endmember from the estimates of the mixing proportions of the spectra of all the endmembers for each image data value; and repeating the estimation of the mixing proportions and the estimation of the spectrum of each endmember until a stopping condition is met, wherein the stopping condition occurs when a relative change in a regularized residual sum of squares determined in the estimation steps attains a threshold, wherein the regularized residual sum of squares comprises a sum of residual sum of squares and a measure of the size of the simplex, the residual squares is reflective of a difference between the multispectral image data and a calculated value based on the estimated mixing proportions and estimated spectrum of each endmember.

2. A method according to claim 1, wherein the measure of the size of the simplex comprises a sum of the squared distances between all of the simplex vertices.

3. A method according to claim 1, wherein the relative change in the regularized residual sum of squares is determined by calculating a ratio comprising successive values of the regularized residual sum of squares.

4. A method according to claim 3, wherein the stopping condition is met when the ratio attains 0.99999.

5. A method according to claim 1, wherein the step of estimating the spectrum of each endmember is conducted using a linear estimation technique.

6. A method according to claim 1, wherein the step of estimating the mixing proportions is conducted using a quadratic minimization technique.

7. A method according to claim 1, wherein estimating the mixing proportions for each data value occurs iteratively so as to minimize a first regularized residual sum of squares, the first regularized residual sum of squares comprising a term which is a measure of the size of the simplex.

8. A method according to claim 7, wherein estimating the spectrum of each endmember occurs iteratively so as to minimize a second regularized residual sum of squares, the second regularized residual sum of squares comprising a term which is a measure of the size of the simplex.

9. A method according to claim 8, wherein the relative change in the regularized residual sum of squares is determined by calculating a ratio comprising successive values of a minimized regularized residual sum of squares, wherein the successive values of the minimized regularized residual sum of squares are minima of the second and first regularized residual sum of squares calculated for each repetition of the estimation steps.

10. A method according to claim 8, wherein the stopping condition is met when the ratio attains a tolerance value.

11. A method according to claim 1, wherein the estimated spectra of the endmembers after the stopping condition is met are regarded as the identified endmember spectra values from the multispectral image data.

12. A method according to claim 11, wherein the estimated mixing proportions of each data value after the stopping condition is met are regarded as identified proportions of each of the identified endmember spectra values present in each data value of the multispectral image data.

13. A system for identifying endmember spectra values from a multispectral image comprising multispectral image data, where each multispectral data value is equal to a sum of mixing proportions of each endmember spectrum, said system comprising:

a data processor configured to process a multispectral image comprising multispectral data values so as to obtain endmember spectrum values of a multidimensional simplex having a number of vertices equal to the number of endmembers, the position of each vertex representing a spectrum of one of the endmembers, wherein the data processor is configured to:

provide starting estimates of each endmember spectrum for each image data value;

estimate mixing proportions for each data value from the estimates of the spectra of all the endmembers;

estimate the spectrum of each endmember from the estimates of the mixing proportions of the spectra of all the endmembers for each image data value, and repeat the estimation of the mixing proportions and the estimation of the spectrum of each endmember until a stopping condition is met, wherein the stopping condition occurs when a relative change in a regularized residual sum of squares determined in the estimation steps attains a threshold, wherein that the regularized residual sum of squares comprises the sum of a residual sum of squares and a measure of the size of the simplex, the residual sum of squares being reflective of a difference between the multispectral image data and a calculated value based on the estimated mixing proportions and estimated spectrum of each endmember.

* * * * *